(12) United States Patent
Stegemiller et al.

(10) Patent No.: US 7,290,986 B2
(45) Date of Patent: *Nov. 6, 2007

(54) TURBINE AIRFOIL WITH CURVED SQUEALER TIP

(75) Inventors: Mark Edward Stegemiller, Franklin, OH (US); Chander Prakash, Cincinnati, OH (US); Leslie Eugene Leeke, Burlington, KY (US); Kevin Samuel Klasing, Springboro, OH (US); Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 138 days.

This patent is subject to a terminal disclaimer.

(21) Appl. No.: 11/162,433

(22) Filed: Sep. 9, 2005

(65) Prior Publication Data

US 2007/0059182 A1    Mar. 15, 2007

(51) Int. Cl.
*F01D 5/20*   (2006.01)
(52) U.S. Cl. ............... 416/92; 416/228; 415/173.1
(58) Field of Classification Search ............ 416/237, 416/223 A, 228, 92; 415/173.1
See application file for complete search history.

(56) References Cited

U.S. PATENT DOCUMENTS

| 5,261,789 A | 11/1993 | Butts et al. |
| 5,282,721 A | 2/1994 | Kildea |
| 6,494,678 B1* | 12/2002 | Bunker ............... 416/97 R |
| 6,672,829 B1* | 1/2004 | Cherry et al. ........... 416/97 R |
| 6,790,005 B2 | 9/2004 | Lee et al. |

* cited by examiner

*Primary Examiner*—Richard A. Edgar
(74) *Attorney, Agent, or Firm*—Adams Evans P.A.; Janice Whitlow

(57) ABSTRACT

An airfoil for a gas turbine engine includes a root, a tip, a leading edge, a trailing edge, and opposed pressure and suction sidewalls extending generally along a radial axis. The airfoil includes a tip cap extending between the pressure and suction sidewalls; and spaced-apart suction-side and pressure-side tip walls extending radially outward from the tip cap to define a tip cavity therebetween. The pressure-side tip wall includes a continuously concave curved arcuate portion, at least a section of which extends circumferentially outward from a radial axis of the airfoil.

18 Claims, 5 Drawing Sheets

TURBINE AIRFOIL WITH CURVED SQUEALER TIP

BACKGROUND OF THE INVENTION

This invention relates generally to gas turbine engine airfoils, and more particularly to turbine airfoils having reduced tip leakage.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In the turbine, an array of airfoil-shaped turbine blades extend radially outwardly from a supporting rotor disk.

The airfoils have opposed pressure and suction sides extending axially between corresponding leading and trailing edges and radially between a root and a tip. The blade tip is spaced closely to a surrounding turbine shroud. The gas pressure difference between the pressure side tip and the suction side tip causes the gas to leak from the pressure side tip through the tip clearance or gap with the shroud, and toward the suction side tip. This tip leakage flow can not produce useful turbine work and will result in performance loss. Thus, maximum efficiency of the engine is obtained by minimizing the tip clearance. However, the degree to which the gap can be reduce is limited by need to allow for differential thermal and mechanical expansion and contraction between the rotor blades and the turbine shroud to prevent undesirable tip rubs.

Accordingly, some prior art turbine blade designs include an offset on the pressure and/or suction sides in order to increase flow resistance through the tip clearance. Examples of such designs are disclosed in U.S. Pat. No. 6,672,829 to Cherry et al., and U.S. Pat. No. 6,790,005 to Lee et al.

Nevertheless, there remains a need for a turbine blade tip which reduces the overall tip leakage flow and thereby increases the efficiency of the turbine.

BRIEF SUMMARY OF THE INVENTION

The above-mentioned need is met by the present invention, which according to one aspect provides an airfoil for a gas turbine engine including a root, a tip, a leading edge, a trailing edge, and opposed pressure and suction sidewalls extending generally along a radial axis. The airfoil includes a tip cap extending between the pressure and suction sidewalls; and spaced-apart suction-side and pressure-side tip walls extending radially outward from the tip cap to define a tip cavity therebetween. The pressure-side tip wall includes a continuously concave curved arcuate portion, at least a section of which extends circumferentially outward from a radial axis of the airfoil.

According to another aspect of the invention, a turbine blade for a gas turbine engine includes a dovetail adapted to be received in a disk rotatable about a longitudinal axis; a laterally-extending platform disposed radially outwardly from the dovetail; and an airfoil including a root, a tip, a leading edge, a trailing edge, and opposed pressure and suction sidewalls extending generally along a radial axis. The airfoil includes: a tip cap extending between the pressure and suction sidewalls; and spaced-apart suction-side and pressure-side tip walls extending radially outward from the tip cap to define a tip cavity therebetween. The pressure-side tip wall includes a continuously concave curved arcuate portion, at least a section of which extends circumferentially outward from a radial axis of the blade.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
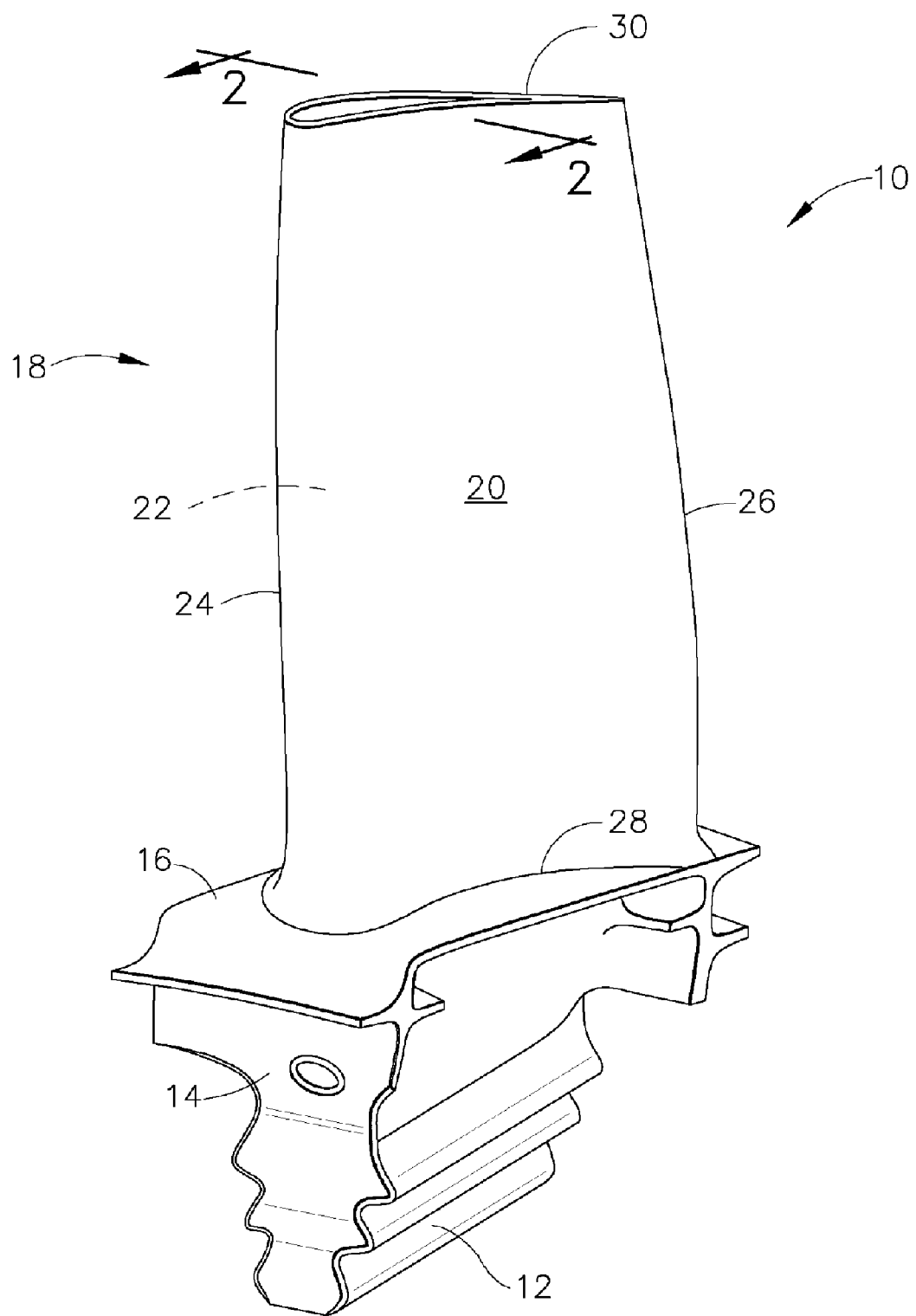
FIG. 1 is a perspective view of an exemplary turbine blade constructed according to the present invention.

Referring to the drawings wherein identical reference numerals denote the same elements throughout the various views, FIG. 1 illustrates an exemplary turbine blade 10. The turbine blade 10 includes a conventional dovetail 12, which may have any suitable form including tangs that engage complementary tangs of a dovetail slot in a rotor disk (not shown) for radially retaining the blade 10 to a disk as it rotates during operation. A blade shank 14 extends radially upwardly from the dovetail 12 and terminates in a platform 16 that projects laterally outwardly from and surrounds the shank 14. A hollow airfoil 18 extends radially outwardly from the platform 16 and into the hot gas stream. The airfoil 18 has a concave pressure sidewall 20 and a convex suction sidewall 22 joined together at a leading edge 24 and at a trailing edge 26. The airfoil 18 extends from a root 28 to a tip 30, and may take any configuration suitable for extracting energy from the hot gas stream and causing rotation of the rotor disk. The blade 10 may be formed as a one-piece casting of a suitable superalloy, such as a nickel-based superalloy, which has acceptable strength at the elevated temperatures of operation in a gas turbine engine. At least a portion of the airfoil 18 is typically coated with a protective coating such as an environmentally resistant coating, or a thermal barrier coating, or both.

Figure 2:
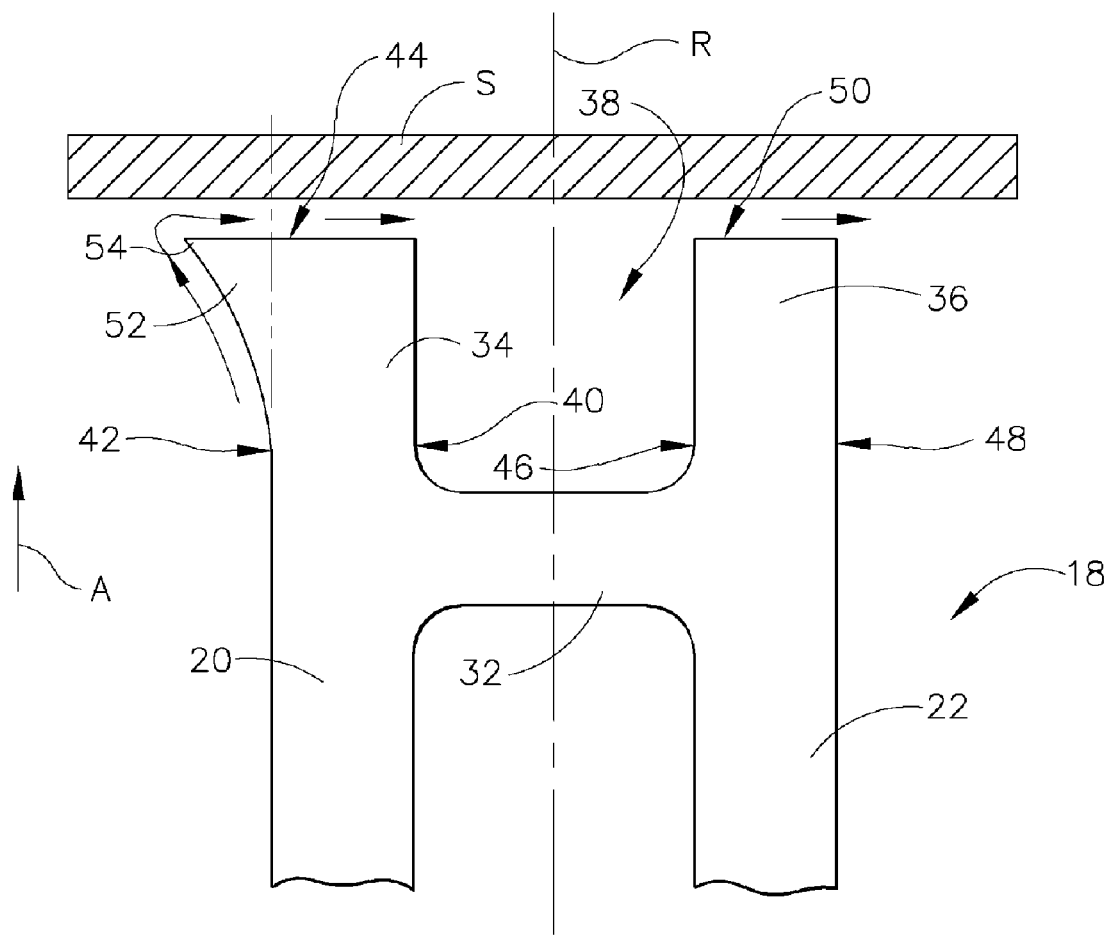
FIG. 2 is a cross-sectional view taken along lines 2-2 of FIG. 1.

As shown more clearly in FIG. 2, the airfoil 18 includes a cast-in tip cap 32, and a so-called "squealer tip", which comprises spaced-apart pressure-side and suction-side tip walls 34 and 36, respectively, extending upwards from the tip cap 32 and surrounding the perimeter of the airfoil 18 to define an open tip cavity 38. The squealer tip may be integrally cast as part of the airfoil 18 or it may be made separately and attached thereto.

The pressure-side tip wall 34 has an inner surface 40 which faces the tip cavity 38, an outer surface 42 which faces the primary gas flow, and a radially-facing tip surface 44 extending between the inner and outer surfaces 40 and 42. The suction-side tip wall 36 also has an inner surface 46 which faces the tip cavity, an outer surface 48 which faces the gas flow, and a radially-facing tip surface 50 extending between the inner and outer surfaces 46 and 48.

In the example shown in FIG. 2, the inner and outer surfaces 46 and 48 of the suction-side tip wall 50 are substantially parallel to each other and extend in a substantially radial direction. The inner surface 40 of the pressure-side tip wall 34 also extends in a substantially radial direction. However, the outer surface 42 of the pressure-side tip wall 34 extends away from the radial axis "R" of the airfoil 18 in a circumferential direction, and defines a continuously concave curved arcuate portion 52. A tip corner 54 is defined at the junction of the arcuate portion 52 and the pressure-side tip surface 44. The arcuate portion 52 may extend the entire axial length of the airfoil 18, or it may be blended out so that the pressure-side tip wall 34 assumes a conventional, parallel-sided shape at its forward and aft ends, as shown in FIG. 1.

Figure 3:
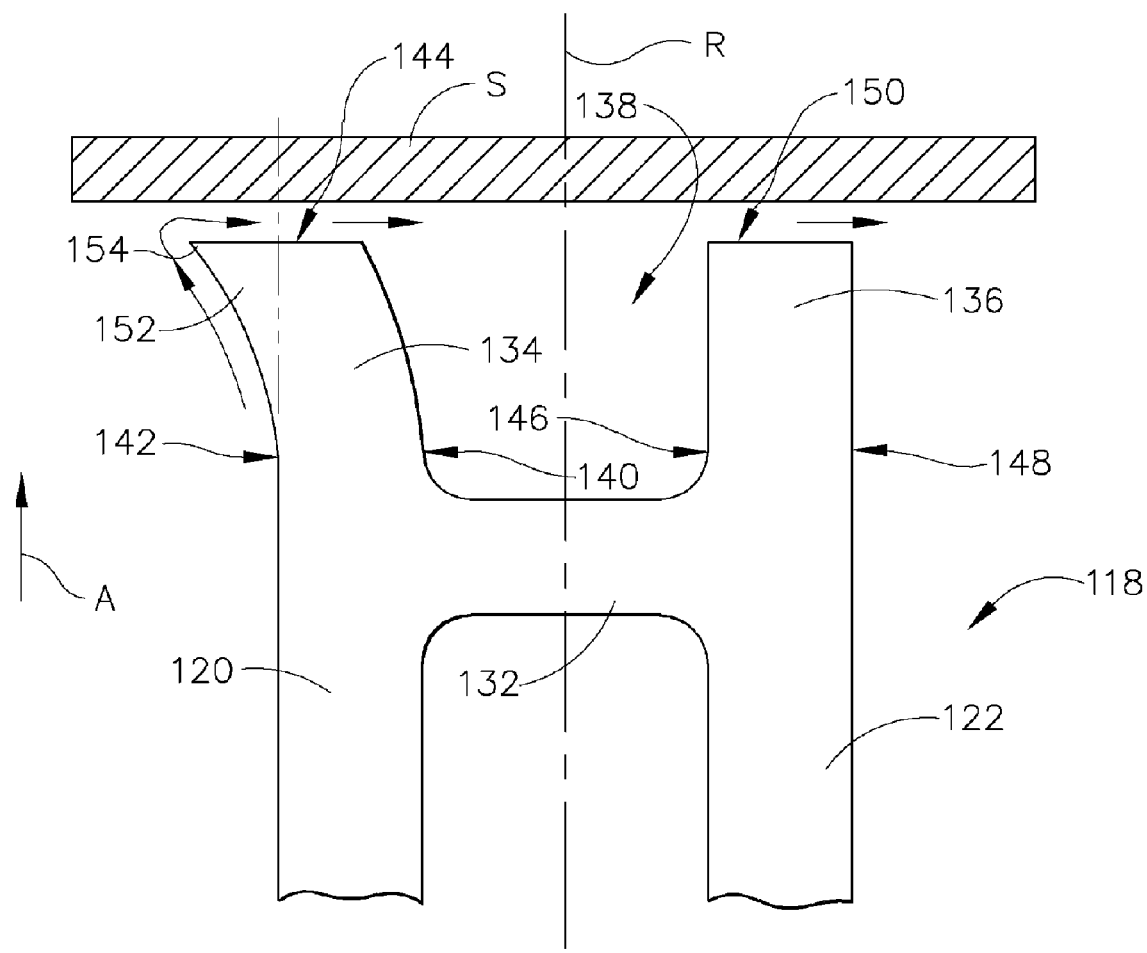
FIG. 3 is a cross-sectional view of a portion of an alternative turbine blade.

FIG. 3 illustrates a tip portion of an alternative airfoil 118, which is substantially similar in construction to the airfoil 18 and includes opposed pressure and suction sidewalls 120 and 122, a tip cap 132, and pressure-side and suction-side tip walls 134 and 136, respectively. The inner and outer surfaces 146 and 148 of the suction-side tip wall 136 are substantially parallel to each other and extend in a substantially radial direction. The inner surface 140 of the pressure-side tip wall 134 is curved outward in a circumferential direction. The outer surface 142 of the pressure-side tip wall 134 extends away from the radial axis R of the airfoil 118 in a circumferential direction, and defines a continuously concave curved arcuate portion 152. A tip corner 154 is defined at the junction of the arcuate portion 152 and the pressure-side tip surface 144. As measured in a circumferential direction, this tip corner 154 is located outside of the plane of the pressure sidewall 134. The arcuate portion 152 may extend the entire axial length of the airfoil 118, or it may be blended out so that the pressure-side tip wall 134 assumes a conventional, parallel-sided shape at its forward and aft ends.

Figure 4:
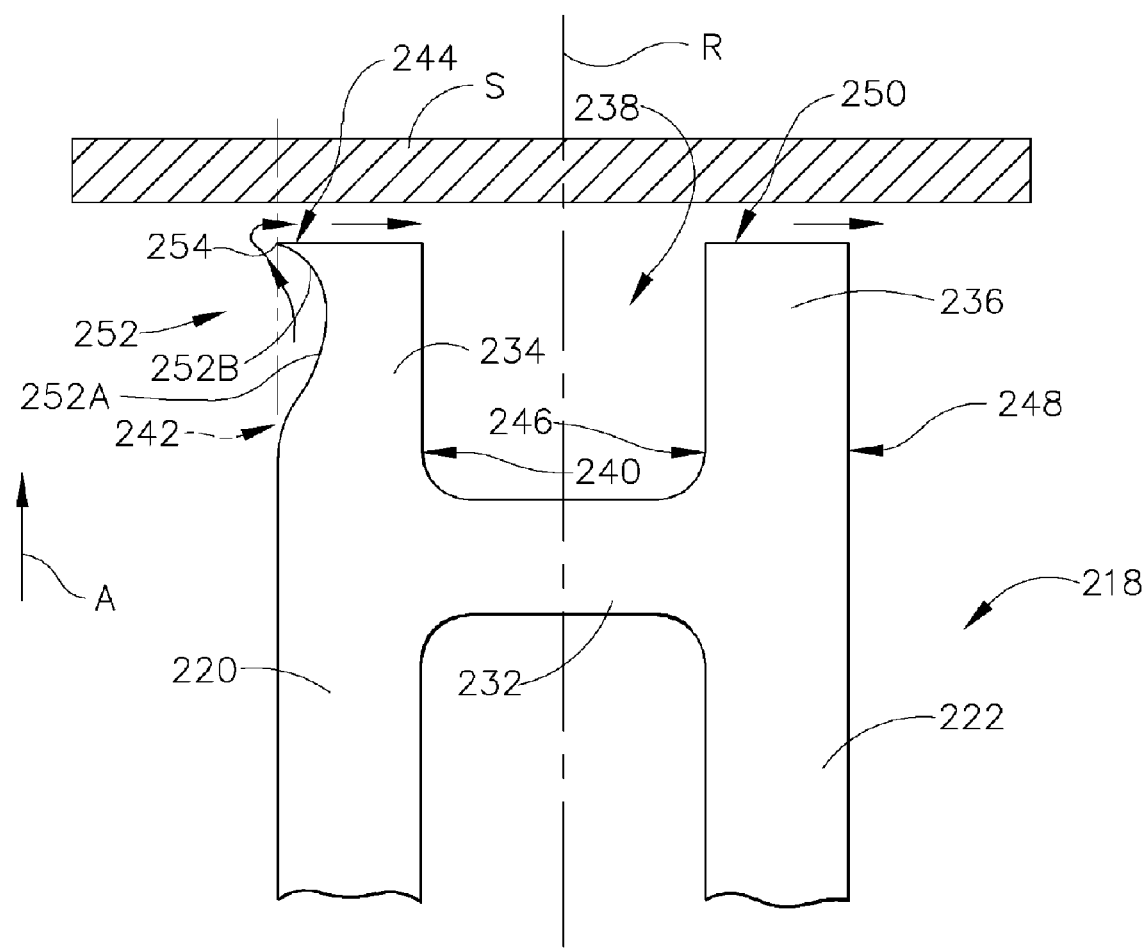
FIG. 4 is a cross-sectional view of a portion of another alternative turbine blade.

FIG. 4 illustrates a tip portion of another alternative airfoil 218, which is substantially similar in construction to the airfoil 18 and includes opposed pressure and suction sidewalls 220 and 222, a tip cap 232, and pressure-side and suction-side tip walls 234 and 236, respectively. The inner and outer surfaces 246 and 248 of the suction-side tip wall 236 are substantially parallel to each other and extend in a substantially radial direction. The inner surface 240 of the pressure-side tip wall 234 also extends in a substantially radial direction. The outer surface 242 of the pressure-side tip wall 234 includes a continuously concave curved arcuate portion 252. The arcuate portion 252 has a lower section 252A which extends inward relative to the radial axis R of the airfoil 218, and an upper section 252B which extends outward in a circumferential direction. A tip corner 254 is defined at the junction of the upper section 252B and the pressure-side tip surface 244. As measured in a circumferential direction, this tip corner 254 does not extend substantially past the outer surface of the pressure sidewall 242.

Figure 5:
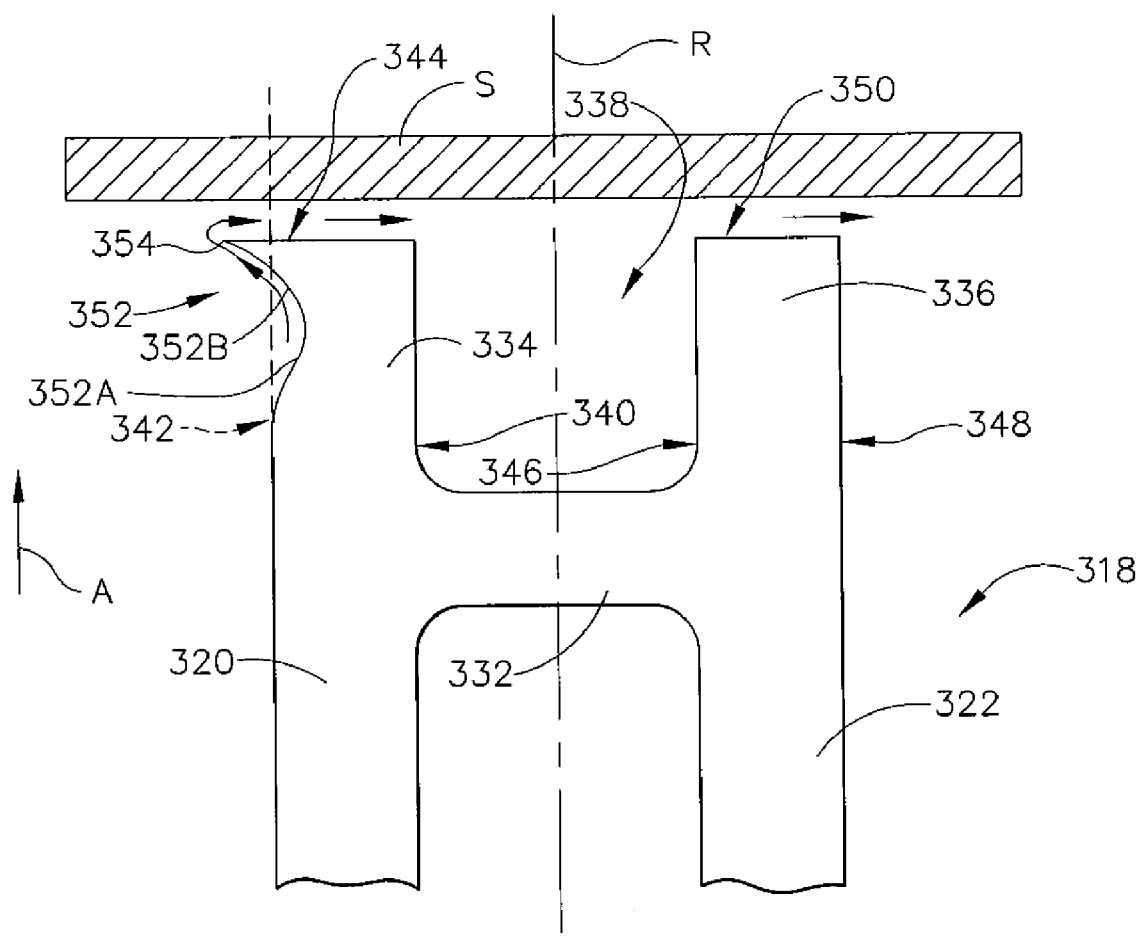
FIG. 5 is a cross-section view of a portion of yet another alternative turbine blade.

FIG. 5 illustrates a tip portion of yet another alternative airfoil 318, which is substantially similar in construction to the airfoil 18 and includes opposed pressure and suction sidewalls 320 and 322, a tip cap 332, and pressure-side and suction-side tip walls 334 and 336, respectively. The inner and outer surfaces 346 and 348 of the suction-side tip wall 336 are substantially parallel to each other and extend in a substantially radial direction. The inner surface 340 of the pressure-side tip wall 334 also extends in a substantially radial direction. The outer surface 342 of the pressure-side tip wall 334 includes a continuously concave curved arcuate portion 352. The arcuate portion 352 has a lower section 352A which extends inward relative to the radial axis R of the airfoil 318, and an upper section 352B which extends outward in a circumferential direction. A tip corner 354 is defined at the junction of the upper section 352B and the pressure-side tip surface 344. As measured in a circumferential direction, this tip corner 354 extends past the outer surface of the pressure sidewall 334.

In operation, the airfoil 18 (which is representative of airfoils 118, 218, and 318) extracts energy from a primary combustion gas flow to cause a turbine rotor (not shown) to which it is mounted rotate. It will also experience a secondary, radially-outward flow along the pressure sidewall 20, as shown by arrow "A" in FIG. 2. Since the secondary flow has to make a turn of more than 90 degrees at the tip corner 54, it will create a flow separation bubble on the top of the tip surface 44 and effectively reduce the effective tip clearance between the airfoil 18 and the shroud "S", lowering the tip leakage flow. This effect is similar to prior art airfoils having inclined squealer tips. However, the curved wall approach allows for an increase in the local radial pumping which will increase the size of the aforementioned separation bubble as the flow turns the greater than 90 degree corner. The arcuate portion 52 will guide the secondary flow further away from the radial direction and require a sharper turning angle as compared to a straight-sided radial or inclined squealer tip wall. Therefore, the reduction of leakage flow will be more effective. The pressure-side tip wall 34 incorporating the arcuate portion 52 has been analytically demonstrated to produce lower tip leakage flow and higher turbine efficiency relative to prior art designs.

The foregoing has described an airfoil for a gas turbine engine having a curved squealer tip. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. An airfoil for a gas turbine engine including a root, a tip, a leading edge, a trailing edge, and opposed pressure and suction sidewalls extending generally along a radial axis, and comprising:
    a tip cap extending between said pressure and suction sidewalls;
    spaced-apart suction-side and pressure-side tip walls extending radially outward from said tip cap to define a tip cavity therebetween;
    wherein said pressure-side tip wall includes a continuously concave curved arcuate portion, at least a section of which extends circumferentially outward from a radial axis of said airfoil.

2. The airfoil of claim 1 wherein said arcuate portion has upper and lower sections,
    said lower section extending circumferentially inward towards said radial axis; and
    said upper section extending circumferentially outward from said radial axis.

3. The airfoil of claim 1 wherein said pressure side tip wall includes spaced-apart inner and outer surfaces joined by a radially-facing tip surface; and
    a tip corner is defined at the junction of said outer surface and said tip surface.

4. The airfoil of claim 3 wherein said inner surface extends in a substantially radial direction.

5. The airfoil of claim 3 wherein said inner surface is curved and extends circumferentially outward from said radial axis of said blade.

6. The airfoil of claim 3 wherein said tip corner extends past an outer surface of said pressure sidewall as measured in a circumferential direction.

7. The airfoil of claim 3 wherein said tip corner does not extend past an outer surface of said pressure sidewall as measured in a circumferential direction.

8. The airfoil of claim 1 wherein said arcuate portion extends for substantially the entire axial length of said airfoil from said leading edge to said trailing edge.

9. The airfoil of claim 1 wherein said arcuate portion extends for substantially less than the entire length of said airfoil from said leading edge to said trailing edge.

10. A turbine blade for a gas turbine engine, comprising:
a dovetail adapted to be received in a disk rotatable about a longitudinal axis;
a laterally-extending platform disposed radially outwardly from said dovetail; and
an airfoil including a root, a tip, a leading edge, a trailing edge, and opposed pressure and suction sidewalls extending generally along a radial axis, said airfoil comprising:
a tip cap extending between said pressure and suction sidewalls;
spaced-apart suction-side and pressure-side tip walls extending radially outward from said tip cap to define a tip cavity therebetween;
wherein said pressure-side tip wall includes a continuously concave curved arcuate portion, at least a section of which extends circumferentially outward from a radial axis of said blade.

11. The turbine blade of claim 10 wherein said arcuate portion has upper and lower sections,
said lower section extending circumferentially inward towards said radial axis; and
said upper section extending circumferentially outward from said radial axis.

12. The turbine blade of claim 10 wherein said pressure side tip wall includes spaced-apart inner and outer surfaces joined by a radially-facing tip surface; and
a tip corner is defined at the junction of said outer surface and said tip surface.

13. The turbine blade of claim 12 wherein said inner surface extends in a substantially radial direction.

14. The turbine blade of claim 12 wherein said inner surface is curved and extends circumferentially outward from said radial axis of said blade.

15. The turbine blade of claim 12 wherein said tip corner extends past an outer surface of said pressure sidewall as measured in a circumferential direction.

16. The airfoil of claim 12 wherein said tip corner does not extend past an outer surface of said pressure sidewall as measured in a circumferential direction.

17. The airfoil of claim 10 wherein said arcuate portion extends for substantially the entire axial length of said airfoil from said leading edge to said trailing edge.

18. The airfoil of claim 10 wherein said arcuate portion extends for substantially less than the entire length of said airfoil from said leading edge to said trailing edge.

* * * * *